United States Patent
Yokota et al.

(10) Patent No.: US 9,777,162 B2
(45) Date of Patent: Oct. 3, 2017

(54) WATERBORNE CURABLE RESIN COMPOSITION

(75) Inventors: Yoshiyuki Yokota, Suita (JP); Masaya Uchida, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 74 days.

(21) Appl. No.: 12/088,559

(22) PCT Filed: Oct. 2, 2006

(86) PCT No.: PCT/JP2006/320145
§ 371 (c)(1),
(2), (4) Date: Mar. 28, 2008

(87) PCT Pub. No.: WO2007/037559
PCT Pub. Date: Apr. 5, 2007

(65) Prior Publication Data
US 2008/0214694 A1    Sep. 4, 2008

(30) Foreign Application Priority Data

Sep. 30, 2005  (JP) ................................. 2005-289035

(51) Int. Cl.
*C09D 4/00* (2006.01)
*C08F 222/10* (2006.01)

(52) U.S. Cl.
CPC .......... *C09D 4/00* (2013.01); *C08F 222/1006* (2013.01)

(58) Field of Classification Search
CPC ............................. C09D 4/00; C08F 222/1006
USPC ................ 522/75–79, 84–85, 120–121, 182; 524/801, 832; 526/328
See application file for complete search history.

(56) References Cited

U.S. PATENT DOCUMENTS

| | | | |
|---|---|---|---|
| 5,475,053 A * | 12/1995 | Niessner et al. ................ | 525/64 |
| 5,501,942 A | 3/1996 | Salvin et al. | |
| 5,691,006 A | 11/1997 | Salvin et al. | |
| 5,905,109 A * | 5/1999 | Shimizu ..................... | C08J 3/07 |
| | | | 524/504 |
| 6,319,966 B1 * | 11/2001 | Kang et al. .................... | 523/201 |
| 2002/0045702 A1 * | 4/2002 | Nakamura et al. ........... | 524/801 |
| 2002/0068785 A1 | 6/2002 | Quis et al. | |
| 2003/0065047 A1 * | 4/2003 | Katou ............................. | 522/1 |
| 2004/0241484 A1 | 12/2004 | Uchida et al. | |

FOREIGN PATENT DOCUMENTS

| | | | |
|---|---|---|---|
| JP | 51-125152 | 11/1976 | |
| JP | 51-125152 A | 11/1976 | |
| JP | 61-163912 | 7/1986 | |
| JP | 63-289075 | 11/1988 | |
| JP | 63-289075 A | 11/1988 | |
| JP | 05-009407 | 1/1993 | |
| JP | 09-302266 | 11/1997 | |
| JP | 09-310042 | 12/1997 | |
| JP | 10-182771 | * 7/1998 | ............ C08F 299/06 |
| JP | 11-158419 | 6/1999 | |
| JP | 2002-161105 | 6/2002 | |

OTHER PUBLICATIONS

Capek, (1994) Macromol. Chem. Phys.195, p. 1137-1146.*
Machine english translation of JP 09-302266, Uno et al., Nov. 1997.*
Polysciences, 1,1,1-Trimethylolpropane Triacrylate MSDS (p. 1-3).*
Hiroshi Sawada, Design of Water-based UV/EB Curable Resins, Lectures of Polymer Materials for Color Materials, 2001, pp. 35-43.
Michio Takao, Water-based UV Curable Inks, Report of Research & Development, Jan. 2005, vol. 34 No. 1, pp. 52-57.
Extended Search Report for a counterpart European Patent Application No. 06811472.7, dated Jan. 20, 2010.

* cited by examiner

*Primary Examiner* — Michael Pepitone
*Assistant Examiner* — Jessica Roswell
(74) *Attorney, Agent, or Firm* — Polsinelli PC

(57) ABSTRACT

To provide a waterborne curable resin composition that is advantageous for environmental protection measures, can be applied without use of a film-forming assistant and can improve the dispersion stability of the emulsion, and also improve physical properties of the coat such as curability, durability, and stain resistance.

A waterborne curable resin composition having an acrylic emulsion produced by emulsion polymerization, wherein the acrylic emulsion contains a curable monomer and/or oligomer in emulsion particles.

15 Claims, No Drawings

WATERBORNE CURABLE RESIN COMPOSITION

RELATED APPLICATIONS

This application is a national stage application (under 35 U.S.C. §371) of PCT/JP2006/320145 filed Oct. 2, 2006, which claims benefit of Japanese application 2005-289035 filed Sep. 30, 2005, disclosure of which is incorporated herein by reference.

TECHNICAL FIELD

The present invention relates to waterborne curable resin compositions. More specifically, the invention relates to waterborne curable resin compositions that can cope with environmental problems and are suitably used in a variety of applications that require formation of coats having various physical properties by curing by means of ultraviolet rays, and the like.

BACKGROUND ART

Waterborne curable resin compositions can cope with environmental problems due to the advantage of being waterborne and exhibit various physical properties because of curability. Thus, the resin compositions are suitably used in various applications that require formation of coats having various physical properties by curing, for example, by means of ultraviolet rays, and the like. Such waterborne types of curable resin compositions include a water dispersion type (also called an emulsion type) and a water-soluble type. The water dispersion type is produced by water dispersing an ultraviolet-ray (UV) resin with an activator and used. In regard to dispersion stability, the type has a property of tending to agglutinate before irradiation of ultraviolet rays. As the water-soluble type, a water soluble type of a UV curable resin is known. The water-soluble type is, however, hydrolysable and unstable, and is low in water resistance due to a lot of hydrophilic groups such as acid groups and polyethylene glycol (PEG) groups. In addition, the water-soluble type having PEG groups, and the like tends to be soft when cured, so the type may spoil the advantage of stiff coat formation due to UV curing.

As conventional UV curable paint compositions, "Design of Waterborne UV/EB Curable Resins" written by Hiroshi Sawada, pp. 35-43, 2001 discloses a UV/EB curable resin in which the fundamental constitution is made of a polymerizable oligomer/reactive diluent/light initiator, and "Water-based UV Curable Inks" written by Michio Takao, Fine Chemicals, No. 1, Vol. 34, pp. 52-57, January, 2005 discloses a water dispersed system made by use of a UV curable resin as an activator.

Furthermore, as the light-sensitive compositions containing water as a solvent or dispersant, Japanese Patent Laid-Open No. 5-9407, p. 1 discloses a light-sensitive composition containing as a binding agent at least a water-soluble, solid, curable film-forming polymer, a water-soluble light-polymerizable acrylate, an oligomer, or a light initiator compound, and Japanese Patent Laid-Open No. 9-302266, pp. 1-2 discloses a water base light-sensitive coating composition made by blending a water base resin dispersant with a light-sensitive polymer or light-sensitive monomer.

When the fundamental constitution is made to be a polymerizable oligomer/reactive diluent/light initiator like the above curable resins, the reactive diluent does not vapor after curing. The composition can substantially be made to be a non-solvent composition and thus is advantageous from the viewpoint of environmental protection measures. However, a composition diluted only with a reactive diluent cannot improve various physical properties of the cured material in balance.

Additionally, in an emulsion that is usually used, a soft cured material does not need a solvent as a film-forming assistant, but a stiff cured material with improved physical properties such as stain resistance needs a solvent as a film-forming assistant such as 2,2,4-trimethyl-1,3-pentadiolmonoisobutyrate. As such, a composition having a polymerizable oligomer/reactive diluent/light initiator as the fundamental constitution or an emulsion system (or only emulsion/film-forming assistant) is advantageous for environmental problems, but cannot promote performance balance in various physical properties. Accordingly, a resin that forms a coat improved in basic performance and can suitably be applied to a variety of applications has been required.

SUMMARY OF THE INVENTION

The present invention has been made in consideration of the above situations. An object of the present invention is to provide a waterborne curable resin composition that is advantageous for environmental protection measures, can be applied without use of a film-forming assistant and can improve the dispersion stability of the emulsion, and also improve physical properties of the coat such as curability, durability, and stain resistance.

The present inventors have studied a waterborne curable resin composition that can sufficiently cope with recent environmental problems from various viewpoints and focused on acrylic emulsions produced by emulsion polymerization, which are suitable in stability, and found that when emulsion particles containing a curable monomer and/or oligomer, the emulsion functions as a film-forming assistant and can cure the emulsion by means of ultraviolet rays, and the like to improve physical properties of the coat such as curability, durability, and stain resistance, having been capable of well solving the above problems to reach the present invention.

That is, the present invention is a waterborne curable resin composition having an acrylic emulsion produced by emulsion polymerization, wherein the acrylic emulsion contains a curable monomer and/or oligomer in emulsion particles.

The present invention is also a use method of the waterborne curable resin composition as a coating agent or a material for forming films.

The present invention is also a coat obtained by painting the waterborne curable resin composition.

DETAILED DESCRIPTION OF THE INVENTION

The present invention will be described in detail hereinafter.

In the waterborne curable resin composition of the present invention, an acrylic emulsion contains a curable monomer and/or oligomer in its emulsion particles. In other words, at least one species of the curable monomer and a curable oligomer is present in the emulsion particles.

Herein, the forms of making the curable monomer and/or oligomer present in acrylic emulsion particles include, for example, (1) a form of absorbing the curable monomer and/or oligomer into acrylic emulsion particles prepared and (2) a form of absorbing the curable monomer and/or oligomer during the preparation of acrylic emulsion particles.

A combination form of these may be acceptable. Preferably, a form of absorbing the curable monomer and/or oligomer into acrylic emulsion particles prepared is made indispensable. In this case, a substance having a property of being penetrated into acrylic emulsion particles is preferably used as the curable monomer and/or oligomer.

In the present invention, the presence of the curable monomer and/or oligomer in acrylic emulsion particles can cause the curable monomer and/or oligomer to function as a film-forming assistant to form a coat in the film-making step even without using a film-forming assistant and cause the curing monomer and/or oligomer also to contribute to curing during curing to improve curability, durability, and stain resistance of the coat.

In the above waterborne curable resin composition, a film-forming assistant may be also added as required. In this case, the amount of film-forming assistant is suitably 20% by weight or less based on 100% by weight of the total amount of curable monomer and/or oligomer and film-forming assistant. More preferably, the amount of film-forming assistant is 10% by weight or less, and particularly preferably the amount is 0% by weight. Namely, the form without the addition of a film-forming assistant is a preferred embodiment of the present invention.

In addition, the reduction of amount of a film-forming assistant used in this way can sufficiently decrease influences of the volatile film-forming assistant on the environment and can improve the curability of a coat that uses a resin composition of the present invention.

Examples of the above film-forming assistants include 2,2,4-trimethyl-1,3-pentadiol, monoisobutyrate, butyl cellosolve, butylcarbitol acetate, 2-ethylhexyldiglycol, propylene glycol methyl ether, propylene glycol, n-propyl ether, propylene glycol n-butyl ether, dipropylene glycol n-butyl ether, tripropylene glycol n-butyl ether, 3-methyl-3-methoxybutanol, 3-methyl-3-methoxybutyl acetate, and the like.

Use of these chemicals lowers a MFT, but a coat obtained by heat or UV curing does not exhibit hardness, and is insufficient in solvent resistance and stain resistance.

The above curable monomers and oligomers can be used when the monomer and/or oligomer is present in the emulsion of a reactive diluent.

For the present invention, preferably, the curable monomer and/or oligomer is a compound that can be made to be absorbed into an acrylic emulsion prepared, or a compound that can be made to be absorbed into an acrylic emulsion during preparation of the emulsion.

When a polymerizable acrylic polymer that is cured by ultraviolet-ray irradiation is used, its curing method varies depending upon conditions such as a light polymerization initiator to be used, the kind of light sources that generate ultraviolet rays, a distance between the light source and the application face. For example, the conditions can include a method that irradiates the polymer with ultraviolet rays with wavelengths of 1000 to 8000 angstroms usually for a few seconds and for a few tens of seconds for even a long period of time.

When the polymer that is cured by electron-beam irradiation is employed, a method that irradiates the polymer with electron beams so as to be an absorption ray of about 1 to 20 M rad usually at an accelerating voltage of 50 to 1000 kev, preferably 100 to 300 kev is exemplified. Electron-beam irradiation may be carried out in the atmosphere, and preferably in an inert gas such as nitrogen. For absorption dosage, irradiation can be performed until a polymerizable double bond remaining in the coat does not affect the coat physical properties. After ultraviolet-ray irradiation or electron-beam irradiation, heating may be carried out to further promote curing, as required.

When the polymer that is cured by heating is used, there can be a method that dries the polymer for 0.5 to 60 minutes with a drying machine at 50 to 200° C. Preferably, the polymer is dried for 5 to 20 minutes at 100 to 180° C. Prior to the above drying step, a substrate may be preheated, or means that performs setting may be utilized in combination. The drying machines include generally used drying machines, such as a jet oven, a hot air dryer, and the like.

Additionally, when the polymer is cured with electron beams, a coat obtained can be improved in coat performance such as weather resistance and water resistance because of no need of a heat or light polymerization initiator.

The above curable monomers and/or oligomers mean monomers and/or oligomers, which are cured or polymerized with ultraviolet rays and heat and/or electron beams, and are hydrophilic or hydrophobic. In other words, the preferred forms of the above curable monomers and/or oligomers include (1) ultraviolet-ray curable hydrophilic monomers, heat curable hydrophilic monomers or electron-beam curable hydrophilic monomers, (2) ultraviolet-ray curable hydrophobic monomers, heat curable hydrophobic monomers or electron-beam curable hydrophobic monomers, (3) ultraviolet-ray curable hydrophilic oligomers, heat curable hydrophilic oligomers or electron-beam curable hydrophilic oligomers, and (4) ultraviolet-ray curable hydrophobic oligomers, heat curable hydrophobic oligomers or electron-beam curable hydrophobic oligomers. The forms suitably include ones that conform film-forming assistant function and curing function, particularly ultraviolet-ray, heat, or electron-beam curing function. More preferably, the forms include hydrophobic monomers and/or hydrophobic oligomers which can be absorbed and readily penetrated into emulsion particles. That is, the above-mentioned curable monomers and/or oligomers are hydrophobic. Hydrophobic curable monomers and/or oligomers having a solubility of 1.0% by weight or less in water at 20° C. are preferable as the curable monomers and/or oligomers. Specifically, preferred are hydrophobic curable monomers and/or oligomers which have a negligible solubility in water, such as 1,6-hexanediol di(meth)acrylate and tripropylene glycol diacrylate. Moreover, the curable monomer is preferably a poly-functional monomer with two or more functional groups having curing reactivity. This can make a coat formed by the waterborne curable resin composition stiff to improve physical properties of the coat.

Namely, the above waterborne curable resin composition is preferably cured or polymerized by means of at least one of an ultraviolet ray, heat and an electron beam. That is to say, such methods may be used singly or in combination of two or more of them for curing or polymerizing the waterborne curable resin composition. Specifically, the following embodiments may be mentioned: an embodiment in which the composition is heated and then, if necessary, irradiated with an ultraviolet ray or an electron beam; and an embodiment in which the composition is irradiated with an ultraviolet ray or an electron beam and then, if necessary, heated. Among them, it is preferable that the composition is irradiated with an ultraviolet ray or an electron beam and then, for completion of the curing, heated as conventionally performed, if necessary.

The above curable monomers and/or oligomers include, for example, 1,6-hexanediol (meth)acrylate, ethoxylated glycerin tri(meth)acrylate, triallyl isocyanate, polyfunctional (meth)acrylates, 1,3-butylene glycol di(meth)acrylate, and 1,4-butanediol (meth)acrylate, EO modified 1,6-hexanediol di(meth)acrylate, 1,9-nonanediol di(meth)acrylate, PO modified neopentyl glycol di(meth)acrylate, PO modified glycerol tri(meth)acrylate, and EO modified trimethylolpropane tri(meth)acrylate. One or more species of these are suitably used. Additionally, the polyfunctional (meth)acrylates may include polyfunctional (meth)acrylates having polyethylene glycol chains.

The above curable monomers preferably include polyfunctional(meth)acrylates. This makes it possible to further sufficiently improve physical properties of a coat such as curability, durability, and stain resistance. Herein, the polyfunctional (meth)acrylate means a (meth)acrylic ester compound, which reacts and has two or more reaction points such as polymerizable double bond or various functional groups in one molecule. Preferably, the (meth)acrylate includes a compound having two or more polymerizable double bond due to (meth)acrylic ester, which is —C=C—COO— or —C=C(CH$_3$)—COO—, in one molecule.

The above polyfunctional (meth)acrylate having polyethylene glycol chains suitably includes a polyalkylene glycol (meth)acrylate expressed by the following general formula (1).

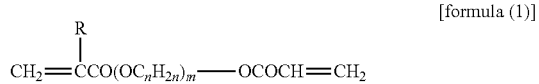

[formula (1)]

In the above formula, R represents H or CH$_3$. n represents 1 to 6, m represents 1 to 50, more preferably n represents 1 to 6, m represents 2 to 30; both n and m are integers.

Additionally, polyethylene glycol diacrylate (trade name "SARTOMER SR-344" available from Tomoe Engineering Co., Ltd.), and tripropylene glycol diacrylate (trade name "Aronics M-220" available from TOAGOSEI Co., Ltd.) are suitable. Furthermore, a compound expressed by the following general formula (2), and 2-(2'-vinyloxyethoxyethyl) acrylate are also suitable.

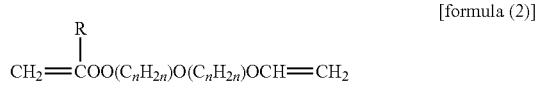

[formula (2)]

R represents H or CH$_3$, n represents 2 to 6, more preferably n represents 2 (an integer).

In the present invention, the inclusion of the curable monomer and/or curable oligomer in the waterborne curable resin composition can lower the minimum film forming temperature (MFT). Additionally, the MFT is the minimum temperature required for emulsion particles to form a coat. When the above curable monomer an/or curable oligomer is not contained, the MFT of the waterborne curable resin composition of the present invention becomes 20° C. or more, and the MFT of the waterborne resin composition containing the curable monomer and/or curable oligomer becomes 0 to 60° C. More preferably, the MFT is 0 to 30° C. This enables the formation of a coat without heating at a high temperature.

The amount of curable monomer and/or curable origomer in order to lower the MFT is 3 to 100% by weight relative to the amount of acrylic emulsion produced by emulsion polymerization. More preferably, the amount is 5 to 60% by weight. Most preferably, the amount is 10 to 40% by weight.

The other curable monomers and/or oligomers include, for example, compounds exemplified in (1) and (2) below. These can be used in combination with the aforementioned preferred curable monomers and/or oligomers.

(1) Acrylic resins containing (meth)acryloyl groups on side chains of the polymers or copolymers of urethane (meth)acrylates, polyfunctional (meth)acrylates, and (meth) acrylic esters (hereinafter, may simply called (meth)acrylic resins.), and polyfunctional radical polymerizable compounds such as epoxy(meth)acrylates and polyester (meth) acrylates. More specifically, di(meth)acrylates such as 1,4-butanediol (meth)acrylate, and bisphenol A di(meth) acrylate; tri(meth)acrylates such as trimethylolpropane tri (meth)acrylate, pentaerythritol monohydroxytri(meth) acrylate, and trimethylolpropane triethoxytri(meth)acrylate; tetra(meth)acrylates such as pentaerythritol tetra(meth)acrylate, and di-trimethylolpropane tetra(meth)acrylate; penta (meth)acrylates such as pentaerythritolpenta/hexa(meth) acrylate, and dipentaerythritol(monohydroxy)penta(meth) acrylate.

(2) Polyolefin-based compounds of being oligomers or monomers having at least two polymerizable unsaturated double bonds such as butadiene, isoprene, chloroprene, divinylbenzene, and diallyl phthalate.

An acrylic emulsion, an essential component of the waterborne curable resin in the present invention, may be produced by usual emulsion polymerization. For example, the acrylic emulsion may be formed by polymerization of an acrylic monomer in a micelle formed in water by an emulsifier and, as required, other monomer components containing monomers by means of an initiator.

Aqueous resin dispersants produced by reacting an acrylic emulsion produced from a polymerizable monomer having a functional group with another compound having reactivity with the functional group may be used as the used acrylic emulsion. Examples of such aqueous resin dispersants include aqueous resin dispersants produced by reacting an acrylic emulsion having a carboxyl group with a compound having an epoxy group, an oxazoline group, an aziridinyl group, and the like; aqueous resin dispersants produced by reacting an acrylic emulsion having an epoxy group with a compound having a carboxyl group, an amino group, and the like; aqueous resin dispersants produced by reacting an acrylic emulsion having a carbonyl group with a compound having a hydrazide group; and aqueous resin dispersants produced by reacting an acrylic emulsion having a hydroxyl group with a compound having an isocyanate group and the like. The following compounds may be mentioned as one example. Isopropenyl oxazoline and polymers containing an oxazoline group may be mentioned as oxazoline group-containing compounds having reactivity with a carboxyl group; glycidyl methacrylate, allyl glycidyl ether, and polymers containing an epoxy group may be mentioned as epoxy group-containing compounds; acrylic acid, itaconic acid, and polymers containing a carboxyl group may be mentioned as carboxyl group-containing compounds having reactivity with an epoxy group; dimethylaminoethyl methacrylate and polymers containing an amino group may be mentioned as amino group-containing compounds; and adipic dihydrazide and polymers, containing a dihydrazide group may be mentioned as hydrazide group-containing compounds having reactivity with a carbonyl group.

These compounds form desired aqueous resin dispersants through reaction using a further introduced functional group after production of the acrylic emulsion. As another method, mentioned may be a method in which the functional group-containing polymerizable monomer and the compound having reactivity with the functional group are kept to be coexistent as they are previously at the emulsion polymerization or immediately after the emulsion polymerization reaction and thereby the monomer and the compound are reacted with each other.

Such acrylic emulsion having reaction points are cured by using the reaction with the polyfunctional (meth)acrylate and/or the functional group-containing compound. Thereby, the cross-linking density can be further increased and a coat having more excellent physical properties such as curability, durability, and stain resistance can be obtained.

In the above waterborne curable resin composition, the difference between $T_g$ of the acrylic emulsion produced by emulsion polymerization and the MFT (minimum film forming temperature) indicated by the waterborne curable resin composition is preferably 10 to 100° C. Herein, the MFT is preferably evaluated by the measuring method described later. The $T_g$ of an acrylic emulsion is preferably a calculation $T_g$. The calculation $T_g$ (glass transition temperature) should be evaluated by means of the following Fox equation. When the calculation $T_g$ is calculated, the MFT is set equal to "0° C." when it is 0° C. or lower, and set equal to "100° C." when it is 100° C. or higher.

$$1/T_g = \Sigma(W_n/T_{gn})/100 \quad \text{Fox equation:}$$

Herein, $W_n$ represents the % by weight of a monomer n, and $T_{gn}$ represents the $T_g$ (absolute temperature) of a homopolymer composed of the monomers n. Additionally, in regard to polymerizable monomer components containing polyethylene glycol diacrylates or trimethylolpropane trimethacrylate, $T_g$ calculated excluding these monomers is regarded as the glass transition temperature of the polymerizable monomer components.

The above acrylic monomer means any one or both of an acrylic monomer having an acryloyl group and a (meth)acryl monomer having a (meth)acryl group. The term "acryl" means acryl and/or (meth)acryl in the present description.

The above acrylic monomers suitably include compounds below and the like. These can be used alone or in combination with two species or more.

Alkyl(meth)acrylates having 1 to 20 carbon atoms such as methyl(meth)acrylate, ethyl(meth)acrylate, n-butyl (meth) acrylate, isobutyl(meth)acrylate, t-butyl(meth)acrylate, 2-ethylhexyl(meth)-acrylate, and tridecyl(meth)acrylate; cycloalkyl(meth)acrylates having 4 to 20 carbon atoms such as cyclohexyl(meth)acrylate, methylcyclohexyl(meth)acrylate, cyclododecyl(meth)acrylate, and t-butylcyclohexyl (meth)acrylate; aralkyl(meth)acrylates having 3 to 20 carbon atoms such as allyl(meth)acrylate, and benzyl(meth) acrylate; eposy group-containing vinyl-based monomers such as glycidyl(meth)acrylate.

Acrylic monomers containing a hydroxyl group such as PlaccelFA-1, PlaccelFA-4, PlaccelFM-1, and PlaccelFM-4 (available from Daicel Chemical Industries, Ltd.), which are obtained by addition of ϵ-caprolactone to 2-hydroxyethyl (meth)acrylate, 2-hydroxypropyl(meth)acrylate, 4-hydroxybutyl(meth)acrylate, and hydroxyalkyl (meth)acrylates, respectively, and (meth)acryloxypolyoxyalkylenes; α,β-ethylenic unsaturated carboxylic acids or unsaturated carboxylic anhydrides such as acrylic acid, (meth) acrylic acid, maleic acid, maleic anhydride, itaconic acid, itaconic anhydride, crotonic acid, fumaric acid, and citraconic acid; (meth)acrylates containing an acidic group such as (meth) acryloxyethyl phosphate, and (meth)acryloxyethyl sulfonic acid; salts of unsaturated carboxylic acids and (meth)acrylates containing an acidic group (alkaline metal salts, ammonium salts, amine salts, and the like).

Half esters of unsaturated carboxylic anhydrides such as maleic anhydride and straight-chain or branched alcohols having 1 to 20 carbon atoms; urethane (meth)acrylate compounds containing an urethane bond such as reactants of compounds containing an isocyanate group and hydroalkyl (meth)acrylates; silicone macromers containing a (meth) acrylic acid group such as organopolyoxysiloxanes containing a (meth)acrylate group such as γ-(meth)acryloyloxypropyl trimethoxysilane, γ-(meth)acryloyloxypropyl triethoxysilane and γ-(meth)acryloyloxypropylmethyl dimethoxysilane; and basic unsaturated monomers such as dimethylaminoethyl (meth)acrylate, diethylaminoethyl (meth)acrylate, dimethylaminoethyl(meth)acrylamide, and dimethylaminopropyl (meth)acrylamide.

Unsaturated sulfonic acids such as ethyl 2-sulfonate (meth)acrylate and its salts; caprolactone denatured substances of (meth)acrylic acid; (meth)acrylates having an amino group such as dimethylaminoethyl(meth)acrylate, t-butyl aminoethyl(meth)acrylate, t-butylaminoethyl(meth) acrylate, t-butylaminopropyl(meth)acrylate, aziridinylethyl (meth)acrylate, and piperidinylethyl(meth)acrylate; and (meth)acrylamides such as (meth)acrylamide, N-monomethyl (meth)acrylamide, N-monoethyl(meth)acrylamide, N,N'-dimethyl(meth)acrylamide, N-methylol (meth)acrylamide, N-butoxy(meth)acrylamide, N-dimethylaminoethyl (meth)acrylamide, N-diethylaminoethyl(meth)acrylamide, N-dimethylaminopropyl(meth)acrylamide, and N-diethylaminopropyl(meth)acrylamide.

Polymerizable monomers having two or more unsaturated bonds such as polyethylene glycol di(meth)acrylate, ethylene glycol di(meth)acrylate, propylene glycol di(meth)acrylate, neopentyl glycol di(meth)acrylate, 1,6-hexanediol (meth)acrylate, and triacyl cyanate; and polymerizable monomers having a light stable group concerning piperidine-based polymerization such as 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloyloxy-1-methoxy-2,2,6,6-tetramethylpiperidine, 4-cyano-4-(meth)acryloyloxy-2,2,6,6-tetramethylpiperidine, 1-(meth)acryloyl-4-(meth) acryloylamino-2,2,6,6-tetramethylppiperidine, and 4-crotonylamino-2,2,6,6-tetramethylpiperidine.

Benzophenone-based polymerizable monomers such as 2-hydroxy-4-[3-(meth)acryloyloxy-2-hydroxypropoxy]benzophenone; polymerizable monomers having an ultraviolet-ray absorbable group such as benzotriazole-based polymerizable monomers such as 2-[2'-hydroxy-5'-((meth) acryloyloxyethyl)phenyl]-2H-benzotriazole, 2-[hydroxyl-5-((meth)acryloyloxymethyl)phenyl]-2H-1,2,3-benzotriazole, 2-[2'-hydroxy-5'-((meth)acryloyloxymethyl)phenyl]-5-cyano-2H-benzotriazole, and 2-[2'-hydroxy-5'-((meth)acryloyloxymethyl)phenyl]-5-t-butyl-2H-benzotriazole.

In addition, the acrylic monomers are preferably alkyl (meth)acrylates having 1 to 20 carbon atoms and cycloalkyl (meth)acrylates having 4 to 20 carbon atoms from the viewpoints of water resistance, weather resistance, and the like, more preferably alkyl(meth)acrylates having 4 to 10 carbon atoms and cycloalkyl(meth)acrylates having 6 to 10 carbon atoms, and further preferably alkyl(meth)acrylates having 4 to 6 carbon atoms and cycloalkyl(meth)acrylates having 6 to 8 carbon atoms. Moreover, the acrylic monomers preferably include polymerizable monomers having a light stable group and/or polymerizable monomers having an ultraviolet-ray absorbable group.

In other words, the preferred embodiments of the above acrylic emulsion in the present invention include a form formed from a polymerizable monomer component that essentially has at least one species of a cycloalkyl(meth)acrylate having 4 to 20 carbon atoms and a polymerizable monomer having a light stable group and/or ultraviolet-ray absorbable group. Namely, the preferred embodiment may be a form formed from a polymerizable monomer component that essentially has only a cycloalkyl(meth)acrylate having 4 to 20 carbon atoms, or may be a form formed from a polymerizable monomer component that essentially has only a polymerizable monomer having a light stable group and/or an ultraviolet-ray absorbable group.

In addition, these alkyl(meth)acrylate and cycloalkyl (meth)acrylate may be used in combination with the above-described acrylic monomers. More preferably, one species or more selected from the group consisting of alkyl(meth) acrylates and cycloalkyl(meth)acrylates are used, and most preferably, two species or more selected from this group are used.

The amount of the above alkyl(meth)acrylate and/or cycloalkyl(meth)acrylate used is, for example, preferably 5 to 60% by weight, more preferably 10 to 50% by weight and further preferably 20 to 40% by weight, based on the total amount of the total monomers used. Additionally, the amount of a monomer used, having a light stable group is preferably 0.1 to 10% by weight, more preferably 0.5 to 0.5% by weight, based on the amount of the total monomers used.

As emulsifiers used in production of the above acrylic emulsions, for example, anionic emulsifiers, nonionic emulsifiers, cationic emulsifiers, amphoteric emulsifiers, and macromolecular emulsifiers can be used.

The above anionic emulsions include, for example, alkyl sulfonates such as ammonium dodecylsulfonate, and sodium dodecylsulfonate; alkylaryl sulfonates such as ammonium dodecylbenzenesulfonate and sodium dodecylnaphthalene sulfonate; polyoxyethylenealkyl sulfonate (e.g., Hitenol 18E, and the like available from DAI-ICHI KOGYO SEI-YAKU Co., Ltd.); polyoxyethylenealkylaryl sulfonates (e.g., Hitenol N-08, available from DAI-ICHI KOGYO SEI-YAKU Co., Ltd.); dialkylsulfo succinates; arylsulfonic acid formaldehyde condensation products; fatty acid salts such as ammonium laurate and sodium stearate; and the like.

The above nonionic emulsifiers include, for example, polyoxyethylenealkyl ether (e.g., Naroacty-N-200, and the like available from Sanyo Chemical, Ltd.), polyoxyethylenealkyl ether (e.g., Nonipol 200, and the like available from Sanyo Chemical, Ltd.); condensation products of polyethylene glycol and polypropylene glycol; sorbitan fatty acid esters; polyoxyethylene sorbitan fatty acid esters; monoglyceride fatty acid; polyamide; condensates of ethylene oxides and aliphatic amines; and the likes.

The above cationic emulsifiers include, for example, alkyl ammonium salts such as dodecylammonium chloride; and the like.

The above amphoteric emulsifiers include, for example, betaine ester type emulsifiers and the like.

The above macromolecular emulsifiers include, for example, poly(meth)acrylates such as sodium polyacrylate; polyvinyl alcohols; polyvinyl pyrolidones; polyhydroxy-alkyl (meth)acrylates such as polyhydroxyethylene acrylate; or copolymers having at least one species of monomers constituting the above polymers as a copolymer component of; and the like.

In the kind of the above emulsifiers, when importance is placed on water resistance, an emulsifier having a polymerizable group may be preferably used. The anionic emulsifiers having a polymerizable group include, for example, bis(polyoxyethylene polycyclic phenyl ether) (meth)acrylated sulfonates (e.g., Antox MS-60, and the like available from Nippon Nyukazai Co., Ltd.), propenyl-alkyl sulfosuccinate, polyoxyethylene (meth)acrylate sulfonate, polyoxyethylene (meth)acrylate sulfonate (e.g., Eleminol RS-30, and the like available from Sanyo Chemical, Ltd.), polyoxyethylenealkylpropenyl phenylether sulfonate (e.g., Aqualon HS-10, and the like available from DAI-ICHI KOGYO SEIYAKU Co., Ltd.), sulfonates of allyloxymethylalkyloxypolyoxyethylenes (e.g., Aqualon KH-10, and the like available from DAI-ICHI KOGYO SEIYAKU Co., Ltd.), sulfonates of allyloxymethylnonylphenoxyethylhydroxypolyoxyethylenes (e.g., Adeka Reasoap SE-10, and the like, available from Adeca Corp.), sulfates having an allyl group such as allyloxymethylalkoxyetylhydroxypolyoxyethylene sulfate (e.g., Adeka Reasoap SR-10N, and the like, available from Adeca Corp.), and the like. The nonionic emulsifiers having a polymerizable group include, for example, polyoxyethylenealkylpropenylphenyl ether (e.g., Aqualon RN-20, and the like available from DAI-ICHI KOGYO SEIYAKU Co., Ltd.), allyloxymethylnonylphenoxyethylhydroxypolyoxyethylene (e.g., Adeka Reasoap NE-10, and the like, available from Adeca Corp.), allyloxymethylalkoxyethylhydroxypolyoxy ethylene (e.g., Adeka Reasoap ER-10, and the like available from Adeca Corp.), and the like.

The above emulsifier may be used alone or in combination with two species or more.

The amount of the above emulsifier used is not particularly limited and, for example, is preferably 0.5 to 5% by weight, more preferably 1 to 3% by weight, based on the amount of the total monomers. When the amount is too large, the water resistance of the coat may be lowered; on the other hand, when the amount is too small, the polymerization stability is lowered.

The initiators of the above emulsion polymerization are not particularly limited and include, for example, azo compounds such as 2,2-azobis(2-diaminopropane)hydrochloride; persulfates such as potassium persulfate; peroxides such as hydrogen peroxide, and the like. Additionally, the polymerization initiator may be used alone, or in combination with two species or more.

The amount of the above polymerization initiator is not particularly limited and may be preferably 0.05 to 1% by weight, more preferably 0.1 to 0.5% by weight, based on the total use amount of the total monomer components. When the amount is less than 0.05% by weight, the polymerization rate is decreased and non-reactive monomers tends to remain; on the other hand, when the amount exceeds 1% by weight, the water resistance of the coat formed tends to decrease. In addition, the polymerization initiator is preferably added at the initial step of polymerization by 40 to 100% by weight % by weight of the total use in order to make fine the resin particles obtained.

The method of adding the above polymerization initiator is not particularly limited and may be, for example, any one of batch loading, split loading, continuous dropping, and the like. Additionally, a part of a polymerization initiator may be added prior to or after dropping of monomer components of the final stage in order to hasten the completion of polymerization.

In the above emulsion polymerization, for example, a reducer such as sodium hydrogensulfite or a transition metal salt such as ferrous sulfate may be added for the purpose of promoting the decomposition of the emulsion initiator.

As a water base medium capable of being used in the above emulsion polymerization step, water is suitable and for example a hydrophilic solvent such as a lower alcohol such as methanol can be used in combination. The amount of the water base medium may be set, as required, in such a way that an acrylic emulsion to be obtained offers desired physical properties.

Additives capable of being used in the above emulsion polymerization include, for example, well-known additives such as pH buffering agents (e.g., compounds having a thiol group such as t-dodecyl mercaptan, and the like) and the like.

The polymerization temperature in the above emulsion polymerization is not particularly limited and preferably 0 to 100° C., more preferably 40 to 95° C. The polymerization time also is not particularly limited, and may be set, as required, in accordance with the progress of the reaction. For example, the time from the polymerization initiation to the completion is preferably in the range of 2 to 8 hours. The atmosphere during polymerization is generally carried out in an atmosphere of nitrogen to enhance the efficiency of the light initiator.

Furthermore, in the present invention the above waterborne curable resin composition preferably contains a light polymerization initiator and/or a heat polymerization initiator.

The above light polymerization initiators and/or heat polymerization resin initiators include, for example, benzophenone, 1-[4-(2-hydroxyethoxy)phenyl]-2-hydroxy-2-methyl-1-propane-1-one, oxy-phenyl-acetic acid 2-[2-oxo-2-phenyl-acetoxy-ethoxy]-ethylester, oxy-phenyl-acetic acid 2-[hydroxyl]-ethoxy-ethylester, 1-hydroxy-cyclohexyl-phenyl-ketone, bis(2,4,6-trimethylbenzoyl)-phenylphosphine oxide, 2-hydroxy-2-methyl-1-phenylpropane-1-one, 1-(4-isopropylphenyl)-2-hydroxy-2-methylpropane-1-one, 2-methyl-1-[4-(methylthio)phenyl]2-morpholinopropane-1-one, 2-morpholinopropane-1-one, iodonium, (4-methylphenyl[4-(2-methylpropyl)phenyl])-hexafluorophosphate, diethylthioxanetone, isopropylthioxanetone. The heat polymerization initiators include, for example, oil soluble initiators such as 2,2-azobis-(2-methylbutylonitrile), 2,2-azobisisobutylonirile, 2,2'-azobis-(2,4'-dimethylvaleronitrile), benzoyl peroxide, 1,1-bis(t-butylperoxi)-3,3,5-trimethylcyclohexane, and t-butylperoxi-2-ethylhexanoate, persulfates such as potassium persulfate, ammonium persulfate, and sodium persulfate; water-soluble peroxides such as hydrogen peroxide, water-soluble azo compounds such as 2,2'-azobis(2-amidinopropane)dihydrochloride, and the like. Of these, one species only may be used or two species or more may be used in combination.

The forms in which the above waterborne curable resin composition contains the light polymerization initiator and/or heat polymerization initiator include (1) a form in which the waterborne curable resin composition contains the light polymerization initiator and/or heat polymerization initiator by directly adding it to or mixing it with an acrylic emulsion produced, and (2) a form in which the light polymerization initiator and/or heat polymerization initiator is once dissolved in the curable monomer and/or curable oligomer and then the resulting material is blended or mixed so that the waterborne curable resin composition contains the light polymerization initiator and/or heat polymerization initiator.

It is preferable that the waterborne curable resin composition of the present invention has a pendulum hardness of 40 or more. Thereby, the composition can provide a cured product with a more sufficient hardness, and therefore can be more preferably used in a variety of applications. The pendulum hardness is more preferably 50 or more and still more preferably 60 or more.

The pendulum hardness can be measured by performing Koening Pendulum Hardness Tester in accordance with ASTM-D4366 and thereby determining the number of reciprocation of the pendulum.

It is preferable that a difference between the calculation Tg and the MFT in the above-mentioned waterborne curable resin composition (waterborne curable resin composition containing the curable monomer and/or curable oligomer), that is "calculation Tg-MFT" is preferably 20 to 90° C. Thereby, such a waterborne curable resin composition can be preferably used in a variety of applications. The difference is more preferably 30 to 80° C.

The calculation Tg (° C.) can be measured from the above-mentioned Fox formula.

The waterborne curable resin composition of the present invention can cope with environmental problems and is suitably used in a variety of applications as a vehicle of a paint, an ink, an adhesive, and other coating agents that are required to be formed by curing coats having various physical properties. Among them, the waterborne curable resin composition is particularly suitable for paint, automobile and film applications. The waterborne curable resin composition used in these applications also is a suitable embodiment form of the present invention.

Moreover, in these applications, the waterborne curable resin composition is preferably used as a coating agent or a material for forming films. Thus, a use method of the waterborne curable resin composition as a coating agent or a material for forming films is also included in the present invention.

A coat obtained by painting of the above waterborne curable resin composition is also included in the present invention. A sleat, an automotive steel plate, and a film each obtained by painting of the above-mentioned waterborne curable resin composition are also included in the preferable embodiments of the present invention.

Such a coat of the present invention can be produced by applying the waterborne curable resin composition of the present invention on a substrate such as slate plate, flexible board, cement slag papermaking board, cement slag molded board, hard wood block cement board, extrusion cement board, metal plate, plastic plate, ceramic plate, wooden board, metal component sheet steel, alkali inorganic ceramic building material, metal building material, dull cold rolled steel plate, zinc phosphate treated steel sheet, PET film, transfer foil film, antireflection film, light diffusion film, plastic optical diffusion, plastic optical component, touch panel, film liquid crystal element, and plastic molded product. Application methods using a brush, a bar coater, an applicator, an air spray, an airless spray, a roll coater, a flow coater, and the like, are mentioned as the method of applying the above-mentioned waterborne curable resin composition.

The above-mentioned coat is generally used as a finishing layer. Such a coat may be directly applied on the substrate. One or two or more layers such as sealer layer and middle-coat layer may exist between the substrate and the coat. Among them, preferred is an embodiment in which a sealer layer and a middle-coat layer are successively formed on the substrate and thereon the coat of the present invention is formed. The above-mentioned coat is any of a sealer layer, a middle-coat layer, and a top-coat layer. The coat is particularly preferably used as a top-coat layer.

The present invention also includes a method of producing the waterborne curable resin composition by causing the curable monomer and/or curable oligomer to be contained in the emulsion particles by using the acrylic emulsion produced by emulsion polymerization. The waterborne curable resin composition produced by such producing method has an advantage in environmental protection measures and enables painting without using a film forming assistant to be capable of improving physical properties of the coat.

The waterborne curable resin composition of the present invention consists of the above constitution, and thus the resin composition has an advantage in environmental protection measures, enables painting without using a film forming assistant to be capable of improving the dispersion stability of the emulsion, and also can enhance physical properties of the coat such as curability, durability, and stain resistance. Such the waterborne curable resin composition can improve, for example, the property of tending to agglomerate prior to ultraviolet-ray irradiation regarding dispersion stability of the water dispersion type, and also can improve stability and physical properties of the coat as compared with the water-soluble type.

BEST MODE FOR CARRYING OUT THE INVENTION

The present invention is described in more detail with reference to Examples below, but the present invention is not limited to only these Examples. The terms, "part(s)" and "%" represent "part(s) by weight" and "% by weight", respectively, unless otherwise specified.

In Examples and Comparative Example below, first, methods that produce solutions (polymer dispersion solutions) in which acrylic emulsions are dispersed before the curable monomer or curable oligomer is added (Production Examples 1 to 6) will be described. Thereafter, the methods of producing waterborne curable resin compositions by addition of the curable monomer or curable oligomer to polymer dispersion solutions and the like produced in Production Examples 1 to 6 will be described in Examples 1 to 16 and Comparative Examples 1 to 4. Lastly, as Examples and Comparative Examples of various applications, Examples 17 to 25 and Comparative Examples 5 and 7 will be described.

In addition, MFT and Tg in Production Examples are evaluated as follows.
<MFT>

On a glass substrate placed on a heat gradient testing machine (trade name: MFT Tester, Tester Corp) a waterborne curable resin dispersion solution produced by the combination indicated in Table 1 by means of a 0.2 mm applicator was applied and the coat was dried by heating (cooling as required) by means of a testing machine. Heating, and the like of the coat was performed with 5° C. heat gradient (temperature gradient) at 4 cm intervals in the temperature range from 10 to 60° C. or from 50 to 100° C. The lowest temperature among temperatures that make film-forming good was selected as the MFT.
<Calculation $T_g$>

The $T_g$ value of each homopolymer used for calculating the glass transition temperature ($T_g$) of a polymerizable monomer component by using the Fox equation was indicated in parentheses.
2-ethylhexyl acrylate (−70° C.)
methyl methacrylate (105° C.)
cyclohexyl methacrylate (83° C.)
acrylic acid (95° C.)
n-butyl methacrylate (20° C.)
4-methacryloyloxy-1,2,2,6,6-pentamethyl piperidine (130° C.)
Y-methacryloxypropyltrimethoxy silane (70° C.)

Production Example 1

In a flask equipped with a dropping funnel, a stirrer, a nitrogen-introducing tube, a thermometer and a refraction condenser, 76.8 g of deionized water was placed. A pre-emulsion that consists of 4.0 g of a 25% aqueous solution of Aqualon HS-10, 4.0 g of 25% aqueous solution of RN-20, 5.8 g of deionized water, 26.0 g of cyclohexyl methacrylate, 3.0 g of n-butyl methacrylat, and 1.0 g of acrylic acid was prepared in the dropping flask. Of this, pre-emulsion, 7.3 g corresponding to 5% of the total amount of monomers was added to the flask and the temperature of the mixture was increased to 75° C. while slowly flowing nitrogen gas into the flask under stirring. After temperature increase, 6.0 g of 5% potassium persulfate aqueous solution was added and polymerization was initiated. At this time, the temperature in the reaction system was raised to 80° C. and maintained for 10 minutes. The procedure until this stage was regarded as the initial reaction. After the completion of the initial reaction, the initial stage pre-emulsion prepared was uniformly dropped over 50 minutes while being maintaining 80° C. in the reaction system. After dropping, the dropping funnel was washed with 5 g of deionized water and the wash was added to the flask. Then, the same temperature was maintained for 30 minutes and the first stage polymerization was completed.

Next, 0.9 g of 25% aqueous ammonia was added and the resulting solution was stirred for 10 minutes. Then, a second stage pre-emulsion minutes that consists of 2.0 g of 25% aqueous solution of Aqualon RN-20, 23.2 g of deionized water, 17.0 g of 2-ethylhexyl acrylate, 14.0 g of cyclohexyl methacrylate, 22.0 g of n-butyl methacrylate, 15.0 g of methyl methacrylate, 1.0 g of γ-methacryloxypropyltrimethoxy silane, and 1.0 g of 1,2,2,6,6-pentamethylpiperidinyl methacrylate was uniformly dropped over 130 minutes. After dropping, the dropping funnel was washed with 5 g of deionized water and the wash was added to the flask. Then, the same temperature also was maintained for 30 minutes and the second stage polymerization was completed. The reaction solution obtained was cooled to room temperature and filtered with a 100 mesh metal gauze, and then an emulsion type polymer dispersion solution 1 having a 43.9% of solid component, viscosity of 320 mPa·s, pH of 9.0, and a MFT (minimum film forming temperature) of 70° C., was obtained (calculation $T_g$: 31° C.).

Production Example 2

An emulsion type of polymer dispersion solution 2 having a 43.8% of solid component, viscosity of 600 mPa·s, pH of 9.0, and a MFT of 30° C. (calculation $T_g$: 21° C.) was obtained in the same way as in Production Example 1, except that 26.0 g of the cyclohexyl methacrylate, the polymerizable monomer for the first stage used, was replaced by 22.0 g of methyl methacrylate and the amount of n-butyl methacrylate was changed from 3.0 g to 7.0 g, and that in the polymerizable monomers for the second, stage 14.0 g of cyclohexyl methacrylate and 22.0 g of n-butyl methacrylate were changed to 35.0 g of cyclohexyl methacrylate, the amount of 2-ethylhexyl acrylate was changed from 17.0 g to 19.0 g and the 1,2,2,6,6-pentamethylpiperidinyl was not used.

Production Example 3

An emulsion type of polymer dispersion solution 3 having a 44.0% solid component, a viscosity of 1200 mPa·s, a pH of 8.9, and a MFT of 100° C. or more (calculation $T_g$: 74° C.) was obtained in the same way as in Production Example 1, except that n-butyl methacrylate, the polymerizable monomer for the first stage used in Production Example 1, was replaced by methyl methacrylate, 17 g of 2-ethylhexyl acrylate, the polymerizable monomer for the second stage, was not used, and the amount of methyl methacrylate was changed from 15.0 g to 32.0 g.

Production Example 4

In a flask equipped with a dropping funnel, a stirrer, a nitrogen-introducing tube, a thermometer and a refraction condenser, 76.8 g of deionized water was placed. A pre-emulsion that consists of 6.0 g of a 25% aqueous solution of ADEKA REASOAP (available from ASAHI DENKA Co., Ltd.), 6.0 g of 25% aqueous solution of ER-20 (available from ASAHI DENKA Co., Ltd.), 29.0 g of deionized water, 50.0 g of methylmethacrylate, 10.0 g of styrene, 30.0 g of 2-ethylhexyl acrylate, 9.0 g of n-butyl methacrylate, and 1.0 g of acrylic acid was prepared in the dropping flask. Of this, pre-emulsion, 7.1 g corresponding to 5% of the total amount of monomers was added to the flask and the temperature of the mixture was increased to 75° C. while slowly flowing nitrogen gas into the flask under stirring.

After temperature increase, 6.0 g of 5% potassium persulfate aqueous solution was added and polymerization was initiated. At this time, the temperature in the reaction system was raised to 80° C. and maintained for 1.0 minutes. The procedure until this stage was regarded as the initial reaction.

After the completion of the initial reaction, the prepared pre-emulsion was uniformly dropped over 180 minutes while being maintaining 80° C. in the reaction system. After dropping, the dropping funnel was washed with 10 g of deionized water and the wash was added to the flask. Then, the same temperature was maintained for 30 minutes. The reaction solution obtained was cooled to room temperature and neutralized with 0.9 g of ammonium, and stirred for 10 minutes. Then, the reaction solution was filtered with a 100 mesh metal gauze, and then an emulsion type polymer dispersion solution 4 having a 44.0% of solid component, viscosity of 210 mPa·s, pH of 9.1, and a MFT of 35° C., was obtained (calculation $T_g$: 21° C.).

Production Example 5

An emulsion type of polymer dispersion solution 5 having a 43.5% of solid component, viscosity of 400 mPa·s, pH of 8.9, and a MFT of 100° C. or more (calculation $T_g$: 31° C.) was obtained in the same manner as in Production Example 1, except that 26.0 g of the cyclohexyl methacrylate was replaced by 11 g of cyclohexyl methacrylate and 15.0 g of trimethylolpropane trimethacrylate in the polymerizable monomers for the first stage used, and in the polymerizable monomers for the second stage, 22.0 g of the n-butyl methacrylate and 17.0 g of the 2-ethylhexyl methacrylate were replaced by 14.0 g of 2-ethylhexyl methacrylate and 25.0 g of trimethylolpropane trimethacrylate.

Production Example 6

Into a flask, 0.4 g of methanol solution prepared by dissolving 0.08 g of benzyl trimethyl ammonium chloride in 234.7 g of the polymer dispersion solution 1 obtained in Production Example 1, and a mixed solution of 1.6 g of allyl glycidyl ether and 1.6 g of isopropyl alcohol were charged. The temperature in the reaction system was raised to 85° C. and maintained for 180 minutes to complete the reaction.

The reaction solution obtained was cooled to room temperature. Then, an emulsion type polymer dispersion solution 6 having a 44.0% of solid component, viscosity of 400 mPa·s, pH of 8.9, and a MFT of 75° C., was obtained.

Example 1

Hundred parts of The polymer dispersion solution 1 obtained in Production Example 1 was mixed with 20 parts of polyethylene glycol diacrylate (trade name: SARTOMER SR-344) and 1 part of 1-[4-(2-hydroxyethoxy)phenyl]-2-methyl-1-propane-1-one to obtain a waterborne curable resin of the emulsion type.

The waterborne curable resin dispersion solution obtained was applied on an aluminum plate with a WET4mil applicator and the plate was pre-dried at room temperature for one hour. Then, the plate was irradiated using an ultraviolet-ray irradiating device under conditions of 4.0 kW/cm and 500 mJ/cm$^2$. The performance capabilities of the cured coat obtained (pendulum hardness, solvent resistance, stain resistance, and weather resistance) were tested. Table 2 (A) shows these results.

In addition, pendulum hardness, solvent resistance, stain resistance, and weather resistance are evaluated as follows.
<Pendulum Hardness>
Koenig Pendulum Hardness Tester was carried out in accordance with ASTM-D4366 to determine the number of reciprocation of the pendulum.
<Solvent Resistance>
The obtained coat of the waterborne curable resin composition (the aluminum plate) was rubbed with absorbent cotton that was soaked in an organic solvent (methyl ethyl ketone) and then lightly squeezed. The coat was exposed to the organic solvent to determine the number of rubbing when the coat had holes.
<Stain Resistance>
A 0.05% aqueous carbon solution was applied to a coat 10 times by means of a brush and the coat was dried at 80° C. for one hour. Then, the extent of adhesion of stains with the coat was observed when the coat was rubbed with a brush while water rinsing.
Excellent: no presence of adhesion
Good: almost no presence of adhesion
Average: slight presence of adhesion
Poor: presence of adhesion
<Weather Resistance>
The holding degree of gloss of a coat was measured after 3000 hours using a sunshine weather meter (product name: Sunshine Super Long Life Weather Meter, Suga Test Instruments Co., Ltd.) and evaluated. As the numerical value is large, the weather resistance is high.

Examples 2 to 7

In Examples 2 to 7, the same operation as in Example 1 was repeated, with the exception that for the polymerization dispersion and the curable monomer the curable oligomers indicated in Table 1 were used, to obtain a waterborne curable resin composition (waterborne curable resin dispersion solution). In addition, the same operation as in Example 1 was repeated on the waterborne curable resin dispersion solution. The performance capabilities of the cured coat obtained (pendulum hardness, solvent resistance, stain resistance, and weather resistance) were tested. Table 2(A) shows these results.

Example 8

Hundred parts of the polymer dispersion solution 1 obtained in Production Example 1 was mixed with 20 parts of polyethylene glycol diacrylate (trade name: SARTOMER SR-344) and one part of 2,2'-azobis-(2-methylbutyronitrile) (trade name ABN-E, Japan Hydrazine Company, Inc.) to obtain a waterborne curable resin of the emulsion type. Then, the waterborne curable resin obtained was applied on an aluminum plate with a WET4mil applicator and the plate was dried using a hot air dryer at 150° C. for 20 minutes. Then, the performance capabilities of the cured coat obtained (pendulum hardness, solvent resistance, stain resistance, and weather resistance) were tested. Table 2(A) shows these results.

Example 9

Hundred parts of the polymer dispersion solution 1 obtained in Production Example 1 was mixed with 20 parts of 1,6-hexanediol diacrylate (trade name: SARTOMER SR-238F) to obtain a waterborne curable resin of the emulsion type. Then, the waterborne curable resin obtained was applied on an aluminum plate with a WET4mil applicator and the plate was pre-dried at room temperature for one hour, and then was irradiated with electron beams by means of an area beam type electron-ray irradiating device (under an atmosphere of nitrogen, an acceleration voltage of 200 kv, a dose of 10 Mrad.). The performance capabilities of the cured coat obtained (pendulum hardness solvent resistance, stain resistance, and weather resistance) were tested. Table 2(A) shows these results.

Example 10 to 16

In Examples 10 to 16, the same operation as in Example 1 was repeated, with the exception that for the polymerization dispersion and the curable monomer the curable oligomers indicated in Table 1 were used, to obtain a waterborne curable resin composition (waterborne curable resin dispersion solution). In addition, the same operation as in Example 1 was repeated on the waterborne curable resin dispersion solution. The performance capabilities of the cured coat obtained (pendulum hardness, solvent resistance, stain resistance, and weather resistance) were tested. Table 2(A) shows these results.

Comparative Example 1

Hundred parts of the polymer dispersion solution 2 obtained in Production Example 2 was mixed with 20 parts of pentaerythritol tetraacrylate and 1 part of 1-[4-(2-hydroxyethoxy)phenyl]-2-hydroxy-2-methyl-1-propane-1-one to obtain an emulsion type waterborne curable resin. The resin was applied on an aluminum plate with a WET4mil applicator and the plate was preliminarily dried at a room temperature. However, the MFT was not lowered, which fails to obtain a fused continuous coat.

Comparative Example 2

Hundred parts of the polymer dispersion solution 1 obtained in Production Example 1 was mixed with 5 parts of 2,2,4-trimethyl-1,3-pentanediol monoisobutylate (trade name: CS-12 available from Chisso Corp.) and 5 parts of butyl cellosolve. One day later, the resin dispersion solution obtained for comparison was applied on an aluminum plate with a WET4mil applicator and the plate was dried with a heat air drier at 100° C. for 10 minutes. Then, the performance capabilities of the cured coat obtained (pendulum hardness, solvent resistance, stain resistance, and weather resistance) were tested. Table 2(B) shows these results.

Comparative Example 3

In a flask equipped with a dropping funnel, a stirrer, a nitrogen-introducing tube, a thermometer and a refraction condenser, 50.0 g of polyethylene glycol diacetate (trade name: SARTOMER SR344), 45.0 g of 2-ethylhexyl acrylate, 5.0 g of acrylic acid, 200 g of isopropyl alcohol, and 1.0 g of azobisisobutyl nitrile (AIBN) were placed. After it was put in a hot water bath and refluxed for 6 hours, 1.0 g of AIBN was further added thereto, and additional two-hour heating and stirring were continued to remove the solvent. Moreover, 200 g of water was added to the system while the system being pressure-reduced to 40 mmHg or lower at the same temperature to yield a polymer dispersion solution for comparison 3 having a 33.1% of solid component, viscosity of 8600 mPa·s, pH of 3.5, and a MFT of 0° C. or less and calculation $T_g$=60° C. With 100 parts of this aqueous polymer solution 3 was one part of 1-[4-(2-hydroxyethoxy)phenyl]-2-hydroxy-2-methyl-1-propane-1-one mixed to obtain a waterborne curable resin composition of the water dispersion type (waterborne curable resin dispersion solution). The same operation as in Example 1 was repeated on the waterborne curable resin dispersion solution obtained, with the performance capabilities of the resulting cured coat (pendulum hardness, solvent resistance, stain resistance, and weather resistance) tested. Table 2(B) shows these results.

Comparative Example 4

Hundred parts of the polymer dispersion solution 5 obtained in Production Example 5 was mixed with 5 parts of 2,2,4-trimethyl-1,3-pentanediol monoisobutylate (trade name: CS-12, available from Chisso Corp.) and 5 parts of butyl cellosolve. One day later, the resin dispersion solution obtained was applied on an aluminum plate with a WET4mil applicator and the plate was dried with a heat air drier at 100° C. for 10 minutes. However, the MFT was not lowered, which fails to obtain a fused continuous coat.

TABLE 1

|  | Polymer dispersion solution | Curable monomer or curable oligomer (Film-forming assistant) |
| --- | --- | --- |
| Example 2 | 1 | 1,6-hexanediol diacrylate |
| Example 3 | 1 | tripropylene glycol diacrylate |
| Example 4 | 1 | 2-(2'-vinyloxyethoxyethyl) acrylate |
| Example 5 | 2 | tripropylene glycol diacrylate |

TABLE 1-continued

| | Polymer dispersion solution | Curable monomer or curable oligomer (Film-forming assistant) |
|---|---|---|
| Example 6 | 1 | tripropylene glycol diacrylate (20 parts) ethoxylated glycerin triacrylate (10 parts) |
| Example 7 | 3 | 1,6-hexanediol diacrylate |
| Example 8 | 1 | polyethylene glycol diacrylate (20 parts) 2,2'-azobis-(2-methylbutyronitrile) (1 part) |
| Example 9 | 3 | 1,6-hexanediol diacrylate |
| Example 10 | 1 | EO modified 1,6-hexanediol diacrylate (4 mole adduct, PHOTOMER4011: product of Cognis Corp.) |
| Example 11 | 1 | EO modified trimethylolpropane triacrylate (6 mole adduct, SARTMER SR-499: product of Sartomer company) |
| Example 12 | 1 | polyethylene glycol dimethacrylate (4 mole adduct, SARTMER SR-210:product of Sartomer company) |
| Example 13 | 4 | 1,6-hexanediol diacrylate |
| Example 14 | 1 | 1,4-butanediol diacrylate |
| Example 15 | 6 | 1,6-hexanediol diacrylate |
| Example 16 | 1 | 1,6-hexanediol dimethacrylate |
| Comparative Example 1 | 2 | pentaerythritol tetraacrylate |
| Comparative Example 2 | 1 | 2,2,4-trimethyl-1,3-pentanediol monoisobutylate (5 parts) butyl cellosolve (5 parts) |
| Comparative Example 4 | 5 | 2,2,4-trimethyl-1,3-pentanediol monoisobutylate (5 parts) butyl cellosolve (5 parts) |

TABLE 2(A)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|
| MFT of UV-curable Dispersion Solution | <0 | <0 | <0 | <0 | <0 | <0 | <0 | <0 | <0 | <0 | <0 | <0 | <0 | <0 | <0 | <0 |
| Pendulum Hardness (Number) | 70 | 63 | 45 | 45 | 55 | 65 | 90 | 55 | 110 | 60 | 50 | 55 | 60 | 75 | 95 | 60 |
| Solvent Resistance | >50 | >50 | >50 | >50 | >50 | >50 | >50 | >50 | >50 | >50 | >50 | >50 | >50 | >50 | >50 | >50 |
| Stain Resistance | Excellent | Excellent | Excellent | Excellent | Excellent | Excellent | Excellent | Excellent | Excellent | Excellent | Excellent | Excellent | Excellent | Excellent | Excellent | Excellent |
| Weather Resistance | 95 | 93 | 90 | 89 | 60 | 92 | 92 | 94 | 100 | 91 | 90 | 94 | 73 | 89 | 97 | 98 |
| Difference between Calculation Tg and MFT(° C.) | 31 | 31 | 31 | 31 | 21 | 31 | 74 | 31 | 74 | 31 | 31 | 31 | 21 | 31 | 31 | 31 |

TABLE 2(B)

| | Comparative Ex. 1 | Comparative Ex. 2 | Comparative Ex. 3 | Comparative Ex. 4 |
|---|---|---|---|---|
| MFT of UV-curable Dispersion Solution | 30 | <0 | <0 | >100 |
| Pendulum Hardness (Number) | — | 25 | 10 | — |
| Solvent Resistance | — | 20 | 10 | — |
| Stain Resistance | — | Good | Average | — |
| Weather Resistance | — | 95 | 40 | — |
| Difference between Calculation Tg and MFT(° C.) | −9 | 31 | −60 | −69 |

The curable monomers or curable oligomers used in Examples 1 to 16 enables lowering of the minimum film forming temperature (MFT) in the film forming process; however, in Comparative Examples 1 to 4, the curable monomer used cannot lower the MFT.

The testing was unable to be carried out in Comparative Examples 1 and 4 since a homogeneous film was not obtained.

Coating Agent for Building Coating Materials

Example 17

A solvent sealer ("V cellaran#200", available from DAI NIPPON TORYO CO., LTD.) was coated on a sleat plate in 6×70×150 mm ("FLEXHARD (FS-N)") (non asbestos sleate, available from Nozawa Corp.) with an air spray such that the dry weight was 20 g/m². Then, a coating material for forming base coat layers was applied on the sleat plate with an 8 mil applicator.

The coating material for forming base coat layers was prepared at the following formulation.

ACRYSET EX-35 (available from NIPPON SHOKUBAI Co., Ltd.) 300 g, white paste (note 1) 135 g, black paste ("UNIRANT 88", available from UNIRANT Corp.) 10 g, antifoaming agent ("NOPCO 8034L", available from SAN NOPCO Ltd.) 1.5 g, butyl cellosolve 15 g, and a film-forming assistant ("CS-12", CHISSO Corp.) 15 g.
(Note 1)

The white past was prepared by adding 500 parts of glass beads to the following components and stirring the mixture with a homodisper for 3000 $min^{-1} \times 60$ minutes. Dispersant ("DEMOL EP", available from Kao Corp.) 60 g, dispersant ("DISCOAT N-14", available from DAI-ICHI KOGYO SEIYAKU CO., LTD.) 50 g, wetting agent ("EMULGEN909", available from Kao Corp.) 10 g, deionized water 210 g, ethylene glycol 60 g, titanium oxide ("CR-95", available from Ishihara Sangyo Kaisha, Ltd.) 1000 g, and antifoaming agent ("NOPCO 8034L", available from SAN NOPCO Ltd.) 10 g.

The above-mentioned coating material for forming base coat layers was diluted with water to prepare a 20% solution thereof. Then, the solution was applied with an air spray such that the wet weight was 150 g/m². Then, after setting for 3 minutes, the plate was dried for 10 minutes with a hot air dryer (available from TABAI Corp, drying temperature 100° C., air volume 1 m/second).

The plate was taken out of the dryer and 10 minutes later, a waterborne aqueous curable resin dispersion solution for evaluation was applied with a 4mil applicator and, 3 minute later, irradiated with an ultraviolet-ray irradiating device under conditions of 4.0 kW/cm and 500 mJ/cm². Thereby, a cured coat of the building coating material. The obtained curable coat was measured for physical evaluation such as blocking resistance, freeze thaw resistance, and warm water whitening resistance according to the following procedures, respectively. Table 3 shows the results.

The waterborne curable resin dispersion solution for evaluation was prepared by the following procedures.

With 100 parts of the polymer dispersion solution obtained in Example 1, 20 parts of 1,6-hexanediol diacrylate ("SARTOMER SR-238F, available from of Sartomer company) was mixed. Thereto, 1 part of 1-[4-(2-hydroxyethoxy) phenyl]-2-methyl-1-propane-1-one was mixed. Thereby, an emulsion type waterborne curable resin was obtained.

Comparative Example 5

The resin dispersion solution for comparison obtained in Comparative Example 2 instead of the waterborne curable resin dispersion solution for evaluation prepared in Example 17 was applied with a 4mil applicator. After setting for 3 minutes, the plate was dried with a hot air dryer at 100° C. for 10 minutes. Thereby, a cured coat of the building coating material for comparison was obtained. The obtained curable coat was subjected to physical evaluation according to the following procedures. Table 3 shows the results.

<Blocking Resistance>

The test plate taken out of the dryer was cooled for 90 seconds. Then, a gauze, a glass-plate, and a weight (movable load: 120 g/cm²) were placed on the test plate in this order. This plate was promptly moved in a hot air dryer at 100° C., and the placing state was continued for 10 minutes. Then, the test plate was cooled at 30° C. or less, and the gauze was separated. The coat was observed for appearance, and evaluated based on the following standard.
Excellent: No marks of the intersection of the gauze were observed.
Good: Marks of the gauze were slightly observed.
Average: Shallow marks of the gauze were observed.
Poor: Cancelluous marks of the gauze remained <Freeze Thaw Resistance>

A sealer and a base coat layer were applied and dried under the same conditions as in the test plate prepared for the blocking resistance test, as mentioned above. Then, the waterborne resin composition for evaluation was applied with an 8 mil applicator. After setting for 10 minutes, the plate was dried at 100° C. for 10 minutes. The obtained sleat plate was left at a room temperature for 1 week. The side and back face of the plate were sealed with a 2 pack type curable acrylic resin solvent. Then, the plate was left for 1 day. After that, the plate was subjected to freeze thaw resistance test with a freezing and thawing testor (available from Marui Co., Ltd., device name: MIT-1682) according to C666-97 in ASTM standard.

Specifically, the freeze thaw resistance test was performed under the freezing and thawing condition in which one cycle of 2 hours at −20° C. (in air) and 2 hours at 20° C. was repeated 20 times. Then, the coat on the sleat plate was observed for existence of cracks with a 30-power magnifier.
Good: No cracks
Average: Cracks were observed in some places.
Poor: Cracks were observed in the whole surface.
"Warm Water Whitening Resistance"

A sealer and a base coat layer were applied and dried under the same conditions as in the test plate prepared for the blocking resistance test and freeze thaw resistance, as mentioned above. Then, the waterborne resin composition for evaluation was applied with a 4mil applicator. After setting for 10 minutes, the plate was dried at 100° C. for 10 minutes.

The obtained sleat plate was left at a room temperature for 24 hours. The side and back face of the plate were sealed with a 2 pack type curable acrylic resin solvent. Then, the test plate was left for 1 week at a room temperature and then measured for L value (L0) with a color difference meter (available from Nippon Denshoku Industries, Co., Ltd., device name: Spectral Color Meter SE-2000). Then, the sleat Plate was immersed in hot water at 6° C. and 24 hours later, pulled out and wiped to remove moisture. Immediately, the sleat plate was measured for L value (L1) with the above-mentioned color difference meter.

A change value in L value was calculated based on. "ΔL=(L1)−(L0)". Thereby, the cured coat was evaluated for warm water whitening resistance.

TABLE 3

| | Ex. 17 | Curable monomer or curable oligomer (film-forming assistant) |
|---|---|---|
| Blocking resistance | Excellent | Average |
| Freeze thaw resistance | Excellent | Average |
| warm water whitening resistance | 1.0 | 1.9 |

Coating Agent for Automotive Coating Materials

Example 18

A coating material prepared by adjusting resin for metallic base AU 21 of Isamu Paint Co., Ltd. to coating material TG-1 of Nissan was applied on a zinc phosphated steel sheet with a spray such that the dry thickness was 25 μm. Then, 3 minutes later, the waterborne curable resin dispersion solution for evaluation prepared in Example 17 was applied on the steel sheet such that the clear layer had a dry thickness of 35 µm. Then, 10 minutes later, the sheet were irradiated with an ultraviolet-ray irradiating device under conditions of 4.0 kW/cm and 500 mJ/cm². Thereby, a cured coat of the automotive coating material. The obtained curable coat was measured for petrol resistance and pencil hardness according to the following procedures, respectively. Table 4 shows the results.

Comparative Example 6

A cured coat of the automotive coating material for comparison was obtained in the same manner as in Example 18, except that the resin dispersion solution for comparison obtained in Comparative Example 2 was used instead of the waterborne curable resin dispersion solution for evaluation prepared in Example 17, and the sheet was dried with a hot air dryer at 100° C. for 10 minutes. The obtained curable coat was subjected to physical evaluation according to the following procedures. Table 4 shows the results.
"Petrol Resistance"
The obtained test piece was left for 24 hours at a room temperature and then immersed with regular gasoline of COSMO OIL CO., LTD. for 30 minutes at a normal temperature. Thereby, the test piece was subjected to an immersion test. Then, the test piece was observed for appearance.
"Pencil Hardness"
The obtained test piece was left for 24 hours and subjected to pencil scratch test according to JIS-K5600 (1999). The test piece was evaluated base on the scratching.

TABLE 4

|  | Ex. 18 | Comparative Ex. 6 |
| --- | --- | --- |
| Petrol resistance | Nothing peculiar | Expansion |
| Pencil hardness | H | 2B |

Coating Agent for Films

Example 19

The waterborne curable resin dispersion solution for evaluation prepared in Example 17 was applied on a polyethylene terephthalate film (available from TOYOBO CO., LTD., "COSMOSHINE A4300", thickness of 188 µm) with a bar coater. The film was dried at 100° C. for 10 minutes and irradiated with an ultraviolet-ray irradiating device under conditions of 4.0 kW/cm and 500 mJ/cm². Thereby, a cured coat in 3 µm thickness as a coating agent for films was obtained. The obtained curable coat was subjected to physical evaluation of steel-wool resistance and pencil hardness according to the following procedures. Table 5 shows the results.

Comparative Example 7

A cured coat as a coating agent for films for comparison was obtained in the same manner as in Example 17, except that the resin dispersion solution for comparison obtained in Comparative Example 2 was used instead of the waterborne curable resin dispersion solution for evaluation prepared in Example 15, and the film was dried with a hot air dryer at 100° C. for 10 minutes. The obtained curable coat was subjected to physical evaluation according to the following procedures. Table 5 shows, the results.

"Steel-Wool Resistance"
A #0000 steel-wool 100 g was shuttled on the film 10 times at a load of 10 g using a promotion type abrasion resistance testor of Suga Test Instrument Co., Ltd. The film was evaluated by eye observation based on abrasions. The film having no abrasions were evaluated as A; the film having 1 to 10 abrasions were evaluated as B; and the film having 11 or more abrasions were evaluated as C.
"Pencil Hardness"
The obtained test piece was left for 24 hours and subjected to pencil scratch test according to JIS-K5400 (1999). The test piece was evaluated base on the scratching.

TABLE 5

|  | Ex. 19 | Comparative Ex. 7 |
| --- | --- | --- |
| Steel-wool resistance | A | C |
| Pencil hardness | H | 2B |

Coating Agent for Coating Materials

Example 20

As performed in Example 17, a sealer and a base coat layer were applied and maintained. Then, the curable resin dispersion solution for evaluation was applied such that the wet weight was 100 g/m². And 3 minutes later, the test plate was irradiated with an electron beam using an area beam (EB) type electron irradiation device of NHV Corp. (in nitrogen atmosphere, accelerating voltage of 200 kv, dose of 10 Mrad.). Thereby, a cured coat of the building coating material was obtained. The obtained curable coat was subjected to physical evaluation of blocking resistance, freeze thaw resistance, and warm water whitening resistance, as performed in Example 17. Table 6 shows the results.

Example 21

As performed in Example 17, a sealer and a base coat layer were applied and maintained. Then, the curable resin dispersion solution for evaluation was applied such that the wet weight was 100 g/m². After setting for 3 minutes, the test plate was dried with a hot air dryer at 100° C. for 20 minutes. Thereby, a cured coat of the building coating material was obtained. The obtained curable coat was subjected to physical evaluation of blocking resistance, freeze thaw resistance, and warm water whitening resistance, as performed in Example 17. Table 6 shows the results.

TABLE 6

|  | Ex. 20 | Ex. 21 |
| --- | --- | --- |
| Curing Method | EB | Thermal curing |
| Blocking resistance | Excellent | Excellent |
| Freeze thaw resistance | Excellent | Excellent |
| warm water whitening resistance | 1.0 | 1.2 |

Coating Agent for Automotive Coating Materials

Example 22

As performed in Example 17, a base coating material was applied and maintained. Then, the curable resin dispersion solution for evaluation was applied such that the dry thickness of 35 µm. And 3 minutes later, the test plate was irradiated with an electron beam using an area beam type electron irradiation device of NHV Corp. (in nitrogen atmosphere, accelerating voltage of 200 kv, dose of 10 Mrad.). Thereby, a cured coat of the automotive coating material was obtained. The obtained curable coat was subjected to physical evaluation of petrol resistance and pencil hardness as performed in Example 18. Table 7 shows the results.

Example 23

As performed in Example 17, a base coating material was applied and maintained. Then, the curable resin dispersion solution for evaluation was applied such that the dry thickness of 35 μm. After setting for 3 minutes, the test plate was dried with a hot air dryer at 150° C. for 20 minutes. Thereby, a cured coat of the automotive coating material was obtained. The obtained curable coat was subjected to physical evaluation of petrol resistance and pencil hardness as performed in Example 18. Table 7 shows the results.

TABLE 7

|  | Ex. 22 | Ex. 23 |
| --- | --- | --- |
| Curing method | EB | Thermal curing |
| Petrol resistance | Nothing peculiar | Nothing peculiar |
| Pencil hardness | H | H |

Coating Agent for Films

Example 24

The waterborne curable resin dispersion solution for evaluation prepared in Example 17 was applied on a polyethylene terephthalate film (available from TOYOBO CO., LTD., "COSMOSHINE A4300", thickness of 188 μm) with a bar coater such that the dry thickness was 3 μm. The film was dried at 100° C. for 10 minutes and irradiated with an electron beam using an area beam (EB) type electron irradiation device of NHV Corp. (in nitrogen atmosphere, accelerating voltage of 200 kv, dose of 10 Mrad.). Thereby, a cured coat for film coating was obtained. The obtained curable coat was subjected to physical evaluation of steel-wool resistance and pencil hardness, as performed in Example 19. Table 8 shows the results.

Example 25

The waterborne curable resin dispersion solution for evaluation prepared in Example 17 was applied on a polyethylene terephthalate film (available from TOYOBO CO., LTD., "COSMOSHINE A4300", thickness of 188 μm) with a bar coater such that the dry thickness was 3 μm. After setting for 3 minutes, the film was dried at 150° C. for 20 minutes. Thereby, a cured coat for film coating was obtained. The obtained curable coat was subjected to physical evaluation of steel-wool resistance and pencil hardness, as performed in Example 19. Table 8 shows the results.

TABLE 8

|  | Ex. 24 | Ex. 25 |
| --- | --- | --- |
| Curing method | EB | Thermal curing |
| Steel-wool resistance | A | A |
| Pencil hardness | H | H |

The invention claimed is:

1. A building coating agent or an automotive coating agent for building coating material or automotive coating material which comprises a waterborne curable resin composition having an acrylic emulsion, wherein the acrylic emulsion is formed from a polymerizable monomer component that comprises at least one member selected from the group consisting of a cycloalkyl(meth)acrylate having 4 to 20 carbon atoms and a polymerizable monomer having a light stable group and/or ultraviolet-ray absorbable group, and from 0% by weight to not more than 1% by weight of the monomers of at least one member selected from the group consisting of an α, β-ethylenically unsaturated carboxylic acid, salt of an α, β-ethylenically unsaturated carboxylic acid; unsaturated carboxylic anhydride, and half ester of an unsaturated carboxylic anhydride and wherein the acrylic emulsion comprises a polymer dispersion produced by emulsion polymerization and either a curable monomer or a curable oligomer wherein only one from the group of a curable monomer or curable oligomer is included in the waterborne curable resin composition, and wherein the acrylic emulsion contains an emulsifier and the curable monomer or oligomer in emulsion particles; wherein the curable monomer or oligomer is not consumed by the polymerization producing the acrylic emulsion, but the curable monomer or oligomer is present in the acrylic emulsion; and that the curable monomer or oligomer is added to the polymer dispersion; and the curable monomer is a polyfunctional monomer with two or more functional groups having curing reactivity, and wherein a difference between a calculation Tg and a minimum film forming temperature in the waterborne curable resin composition is 20 to 90° C.

2. The building coating agent or an automotive coating agent for building coating material or automotive coating material according to claim 1, wherein the waterborne curable resin composition contains a light polymerization initiator and/or heat polymerization initiator.

3. The building coating agent or an automotive coating agent for building coating material or automotive coating material according to claim 1, wherein the curable monomer is a polyfunctional (meth)acrylate.

4. The building coating agent or an automotive coating agent for building coating material or automotive coating material according to claim 1, wherein the waterborne curable resin composition is cured or polymerized by means of at least one of an ultraviolet ray, heat and an electron beam.

5. The building coating agent or an automotive coating agent for building coating material or automotive coating material according to claim 1, wherein the curable monomer or the curable oligomer is hydrophobic.

6. A coat obtained by painting the building coating agent or an automotive coating agent for building coating material or automotive coating material of claim 1 onto a substrate.

7. The building coating agent or an automotive coating agent for building coating material or automotive coating material according to claim 2, wherein the curable monomer is a polyfunctional (meth)acrylate.

8. The building coating agent or an automotive coating agent for building coating material or automotive coating material according to claim 2, wherein the waterborne curable resin composition is cured or polymerized by means of at least one of an ultraviolet ray, heat and an electron beam.

9. The building coating agent or an automotive coating agent for building coating material or automotive coating material according to claim 3, wherein the waterborne curable resin composition is cured or polymerized by means of at least one of an ultraviolet ray, heat and an electron beam.

10. The building coating agent or an automotive coating agent for building coating material or automotive coating material according to claim 2, wherein the curable monomer or the curable oligomer is hydrophobic.

11. The building coating agent or an automotive coating agent for building coating material or automotive coating material according to claim 1, wherein the waterborne curable resin composition is obtained by absorbing the curable monomer or the curable oligomer into a prepared acrylic emulsion particle.

12. The building coating agent or an automotive coating agent for building coating material or automotive coating material according to claim 1, wherein the acrylic emulsion is formed from a polymerizable monomer component that comprises at least one member selected from the group consisting of an alkyl (meth)acrylate and cycloalkyl (meth)acrylate having 4 to 20 carbon atoms.

13. The building coating agent or an automotive coating agent for building coating material or automotive coating material according to claim 1, wherein the curable monomer or curable oligomer is a hydrophobic curable monomer or a curable oligomer having a solubility of 1.0% by weight or less in water at 20° C.

14. The building coating agent or an automotive coating agent for building coating material or automotive coating material according to claim 1, wherein the acrylic emulsion is prepared by a multistage polymerization and the cycloalkyl(meth)acrylate having 4 to 20 carbon atoms is used in each stage.

15. The building coating agent or an automotive coating agent for building coating material or automotive coating material according to claim 1, wherein the curable monomer contains 2-(2'-vinyloxyethoxyethyl) acrylate.

* * * * *

UNITED STATES PATENT AND TRADEMARK OFFICE
CERTIFICATE OF CORRECTION

PATENT NO. : 9,777,162 B2  
APPLICATION NO. : 12/088559  
DATED : October 3, 2017  
INVENTOR(S) : Yoshiyuki Yokota et al.

Page 1 of 1

It is certified that error appears in the above-identified patent and that said Letters Patent is hereby corrected as shown below:

On the Title Page

At (86) §371 (c)(1), (2), (4), Date should be amended as follows: "Mar. 28, 2008" should read --Apr. 23, 2008--.

Signed and Sealed this
Nineteenth Day of December, 2017

Joseph Matal
*Performing the Functions and Duties of the
Under Secretary of Commerce for Intellectual Property and
Director of the United States Patent and Trademark Office*